United States Patent
Wang et al.

(10) Patent No.: US 11,658,304 B2
(45) Date of Patent: May 23, 2023

(54) COMPOSITE REFERENCE ELECTRODE SUBSTRATE AND METHODS RELATING THERETO

(71) Applicant: GM GLOBAL TECHNOLOGY OPERATIONS LLC, Detroit, MI (US)

(72) Inventors: Yucong Wang, West Bloomfield, MI (US); Zhe Li, Rochester, MI (US); Jing Gao, Rochester, MI (US); Brian J. Koch, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 16/802,898

(22) Filed: Feb. 27, 2020

(65) Prior Publication Data
US 2021/0273229 A1 Sep. 2, 2021

(51) Int. Cl.
- H01M 4/66 (2006.01)
- H01M 4/131 (2010.01)
- H01M 10/0525 (2010.01)
- H01M 50/449 (2021.01)
- H01M 4/02 (2006.01)

(52) U.S. Cl.
CPC ........... H01M 4/661 (2013.01); H01M 4/131 (2013.01); H01M 4/667 (2013.01); H01M 10/0525 (2013.01); H01M 50/449 (2021.01); H01M 2004/021 (2013.01)

(58) Field of Classification Search
CPC .... H01M 4/661; H01M 4/667; H01M 50/449; H01M 2004/021
See application file for complete search history.

(56) References Cited

U.S. PATENT DOCUMENTS

| | | | |
|---|---|---|---|
| 2004/0131934 A1* | 7/2004 | Sugnaux | H01G 11/24 429/231.1 |
| 2005/0117194 A1* | 6/2005 | Kim | G02F 1/155 359/273 |
| 2013/0019468 A1* | 1/2013 | Ramasubramanian | H01M 10/4235 29/623.1 |

FOREIGN PATENT DOCUMENTS

| | | |
|---|---|---|
| CN | 113314698 A | 8/2021 |
| DE | 102021101894 A1 | 9/2021 |
| WO | WO-2018170926 A1 * | 9/2018 |

OTHER PUBLICATIONS

Mozalev, A. et al., "The formation of nanoporous membranes from anodically oxidized aluminum and their application to Li rechargeable batteries," Electrochemica Acta 46 (2001), pp. 2825-2834.

(Continued)

*Primary Examiner* — Matthew T Martin
*Assistant Examiner* — Katharine A Caughron
(74) *Attorney, Agent, or Firm* — Harness, Dickey & Pierce, P.L.C.

(57) ABSTRACT

Composite reference electrode substrates and relating methods are provided. The composite reference electrode substrate includes a separator portion and a current collector portion adjacent to the separator portion. A method for forming the reference electrode substrate includes anodizing one or more surfaces of a first side of an aluminum foil so as to form a porous separator portion disposed adjacent to a porous current collector portion. The porous separator portion includes aluminum oxide, and the current collector portion includes the aluminum foil. The separator portion and the current collector portion each have a porosity of greater than or equal to about 10 vol. % to less than or equal to about 80 vol. %.

5 Claims, 5 Drawing Sheets

(56) References Cited

OTHER PUBLICATIONS

Park, Dongjin et al., "Electrochemical Etching of Aluminum through Porous Alumina," Analytical Sciences (2001), vol. 17 Supplement, pp. a73-a76.
Ma, Tianyuan et al., "Revisiting the Corrosion of the Aluminum Current Collector in Lithium-Ion Batteries," J. Phys. Chem. Lett. (2017) 8, 5, pp. 1072-1077 (Published Feb. 16, 2017); DOI: 10.1021/acs.jpclett.6b02933.

* cited by examiner

COMPOSITE REFERENCE ELECTRODE SUBSTRATE AND METHODS RELATING THERETO

INTRODUCTION

This section provides background information related to the present disclosure which is not necessarily prior art.

The present disclosure relates to reference electrode substrates, for example aluminum composite reference electrode substrates including an aluminum layer and an aluminum oxide layer, reference electrodes incorporating such reference electrode substrates, electrochemical devices including such reference electrodes, and methods of making the same.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium-ion and lithium-sulfur batteries include at least two electrodes and an electrolyte and/or separator. One of the two electrodes includes a positive electroactive material and serves as a positive electrode or cathode, and the other electrode includes a negative electroactive material and serves as a negative electrode or anode. Each of the electrodes is connected to a current collector (typically a metal, such as copper for the negative electrode and aluminum for the positive electrode). A separator and/or electrolyte may be disposed between the negative and positive electrodes. The electrolyte is suitable for conducting lithium ions between the electrodes and, like the two electrodes, may be in various instances solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

It may be desirable to perform electrochemical analysis on batteries or certain components of the batteries during cycling. In many instances, reference electrodes, including reference electrode substrates, enable monitoring of individual potentials during cycling without interfering with battery operation. Common reference electrode substrates include one or more gold layers (e.g., current collector layers) disposed, for example using a sputtering process, on one or more surfaces of a porous separator substrate. The current collector layers are often non-porous, but permeable gold films. Such reference electrodes are often expensive and require complex manufacturing processes. Accordingly, it would be desirable to develop improved reference electrode materials and structures, and methods for making the same, that can address these challenges.

SUMMARY

This section provides a general summary of the disclosure, and is not a comprehensive disclosure of its full scope or all of its features. In various aspects, the present disclosure provides a composite reference electrode substrate. The composite reference electrode substrate includes a separator portion and a current collector portion integral with and adjacent to the separator portion. The separator portion may include aluminum oxide and may have a porosity of greater than or equal to about 10 vol. % to less than or equal to about 80 vol. %. The current collector portion may include aluminum and may have a porosity of greater than or equal to about 10 vol. % to less than or equal to about 80 vol. %. The pores of the separator portion are continuous with pores of the current collector portion such that the pores of the separator portion and the pores of the current collector portion together define a plurality of channels through the composite reference electrode substrate.

In one aspect, the separator portion has a first average thickness of greater than or equal to about 3 µm to less than or equal to about 300 µm and the current collector portion has a second average thickness of greater than or equal to about 5 µm to less than or equal to about 300 µm.

In one aspect, the separator portion has a first average thickness of about 15 µm and the current collector has a second average thickness of about 10 The separator portion may have a porosity of greater than or equal to about 30 vol. % to less than or equal to about 60 vol. %. The current collector portion may have a porosity of greater than or equal to about 30 vol. % to less than or equal to about 60 vol. %.

In one aspect, the separator portion and the current collector portion integral therewith are formed from a single aluminum foil precursor.

In one aspect, the separator portion and the current collector portion may be formed by anodizing one or more surfaces of the aluminum foil precursor.

In one aspect, the separator portion and the current collector portion may be formed by etching one or more surfaces of the aluminum foil precursor.

In various other aspects, the present disclosure provides a method for forming a reference electrode substrate. The reference electrode substrate includes a separator portion and a current collector portion. The method includes anodizing one or more surfaces of a first side of an aluminum foil so as to integrally form the separator portion and the current collector portion. The separator portion may be disposed adjacent to the current collector portion. Each of the separator portion and the current collector portion may be porous and pores of the separator portion may be continuous with pores of the current collector portion such that the pores of the separator portion and the pores of the current collector portion together define a plurality of channels through the reference electrode substrate. The porous separator portion may include aluminum oxide, and the current collector portion may include the aluminum foil.

In one aspect, the method further includes one or more etching steps.

In one aspect, the method includes etching the separator portion so as to increase the porosity of the separator portion. The separator portion has a porosity of greater than or equal to about 10 vol. % to less than or equal to about 80 vol. %.

In one aspect, the method includes etching the current collector portion so as to increase the porosity of the current collector portion. The current collector portion has a porosity of greater than or equal to about 10 vol. % to less than or equal to about 80 vol. %.

In one aspect, the method includes etching the aluminum foil prior to anodizing.

In one aspect, the method further includes prior to anodizing, disposing one or more masks on or near one or more portions of the one or more surfaces of the aluminum foil. The one or more masks defines at least one covered region and at least one exposed region of the one or more surfaces of the aluminum foil. The at least one exposed region is disposed outside the at least one covered region.

In one aspect, the method further includes removing the one or more masks so as to expose the at least one covered region of the one or more surfaces of the aluminum foil so as to define a current collector tab.

In one aspect, the method further includes shaping the current collector tab.

In one aspect, the method further includes shaping the unaltered portions of the one or more surfaces of the aluminum foil and corresponding portions of current collector portion so as to define the current collector tab.

In one aspect, pores of the separator portion may be continuous with pores of the current collector such that the pores of the separator portion and the pores of the current collector define a plurality of channels through the composite reference electrode.

In one aspect, the porous separator portion has a first average thickness of greater of than or equal to about 3 μm to less than or equal to about 300 and the porous current collector portion has a second average thickness of greater than or equal to about 5 μm to less than or equal to about 300 μm.

In various other aspects, the present disclosure includes a method for forming a reference electrode substrate. The reference electrode substrate includes a separator portion and a current collector portion. The method includes disposing a mask on or near at least one portion of the one or more surfaces of an aluminum foil. The mask defines at least one covered region of the one or more surfaces of the aluminum foil. The method may further include anodizing at least one exposed region disposed outside the at least one covered region of the one or more surfaces of an aluminum foil so as to form the separator portion in the at least one exposed region that is disposed adjacent to the current collector portion; and removing the mask so as to expose the at least one cover region of the one or more surfaces of the aluminum foil so as to define a current collector tab. The separator portion includes aluminum oxide, and the current collector portion includes the aluminum foil.

In one aspect, the method further includes at least one of etching the separator portion to increase a porosity of the separator portion and etching the current collector portion to increase a porosity of the current collector portion.

In one aspect, the separator portion has a porosity of greater than or equal to about 10 vol. % to less than or equal to about 80 vol. %, and the current collector portion has a porosity of greater than or equal to about 10 vol. % to less than or equal to about 80 vol. %.

In one aspect, the method further includes shaping the current collector tab.

In one aspect, the separator portion has an average thickness of greater than or equal to about 10 μm to less than or equal to about 50 μm, and the current collector portion has an average thickness of greater than or equal to about 10 μm to less than or equal to about 200 μm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
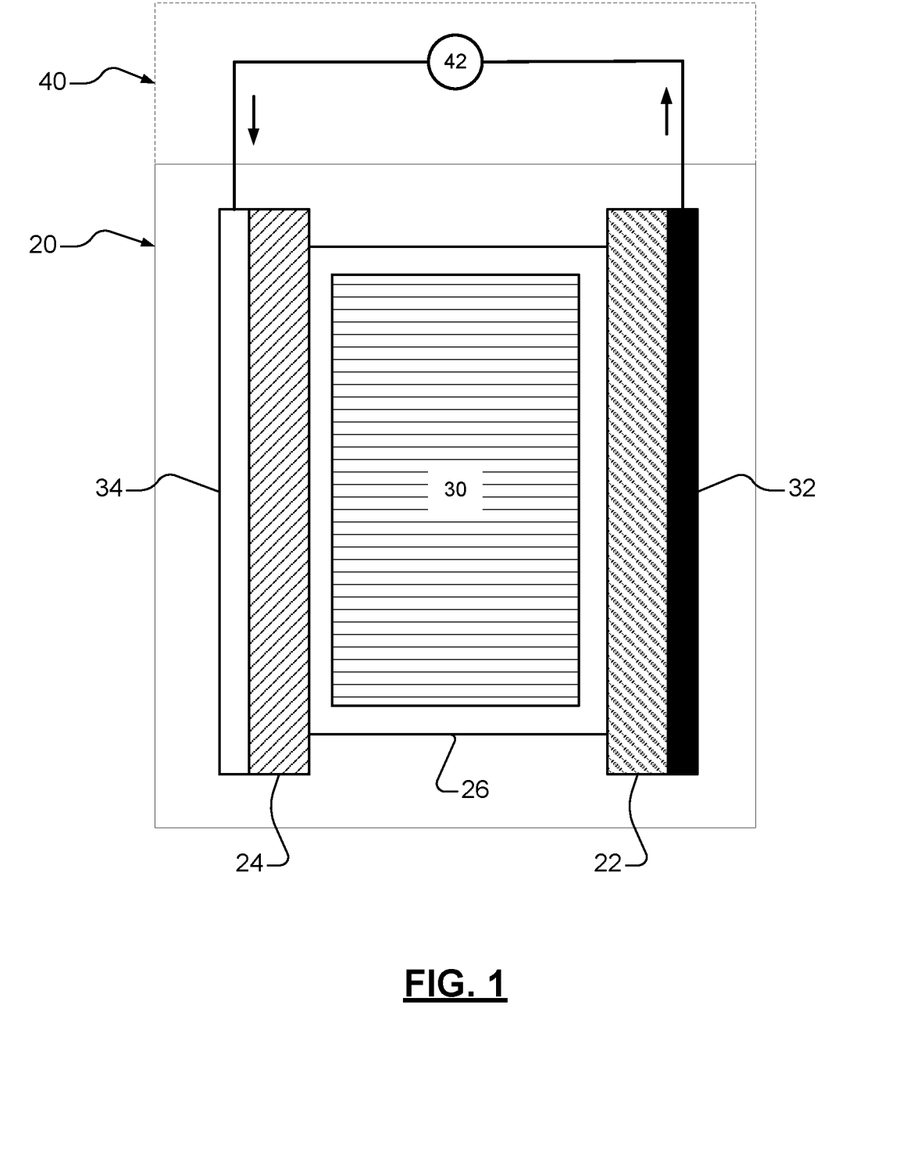
FIG. 1 is a schematic of an example electrochemical device.

Typical lithium-ion or lithium-sulfur batteries often include a first electrode (such as a positive electrode or cathode) opposing a second electrode (such as a negative electrode or anode) and a separator and/or electrolyte disposed therebetween. Often, in a battery pack, batteries or cells may be electrically connected in a stack or winding configuration to increase overall output. Lithium-ion and lithium-sulfur batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and, in various aspects, may be in liquid, gel, or solid form. For example, an exemplary and schematic illustration of an electrochemical cell (also referred to as the battery) 20 is shown in FIG. 1. Though the illustrated example includes a single positive electrode (e.g., cathode) 24 and a single negative electrode (e.g., anode) 22, the skilled artisan will recognize that the current teachings apply to various other configurations of electrochemical cells, including those having one or more positive electrodes and one or more negative electrodes, as well as various current collectors with electroactive layers disposed on or adjacent to one or more surfaces thereof.

The battery 20 includes a negative electrode 22, a positive electrode 24, and a separator 26 disposed between the electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34). The positive electrode current collector 34 may be a metal foil, metal grid or screen, or expanded metal comprising aluminum or any other appropriate electrically conductive material known to those of skill in the art. The negative electrode current collector 32 may be a metal foil, metal grid or screen, or expanded metal, comprising copper or any other appropriate electrically conductive material known to those of skill in the art.

The battery 20 may generate an electric current during discharge by way of reversible electrochemical reactions that can occur, for example, when the external circuit 40 is closed (to connect the negative electrode 22 and the positive electrode 24) and the positive electrode 24 has a potential that is greater than that of the negative electrode 22. The chemical potential difference between the positive electrode 24 and the negative electrode 22 drives electrons produced by a reaction, for example, the oxidation of intercalated lithium, at the negative electrode 22 through the external circuit 40 towards the positive electrode 24, for example, in the direction of the arrows. Lithium ions, which are also produced at the negative electrode 22, are concurrently transferred through the electrolyte 30 contained in the separator 26 towards the positive electrode 24. The electrons flow through the external circuit 40 and the lithium ions migrate across the separator 26 containing the electrolyte 30 to form intercalated lithium at the positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid through a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30, for example inside their pores, capable of conducting lithium ions between the negative electrode 22 and the positive electrode 24. Any appropriate electrolyte 30, whether in solid, liquid, or gel form, capable of conducting lithium ions between the electrodes 22, 24, may be used in the battery 20. For example, the electrolyte 30 may be a non-aqueous liquid electrolyte solution that includes a lithium salt dissolved in an organic solvent or a mixture of organic solvents. Numerous conventional non-aqueous liquid electrolyte solutions may be employed in the battery 20.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiF SI), lithium fluoroalkylphosphate (LiFAP) ($Li_3O_4P$), and combinations thereof.

These and other similar lithium salts may be dissolved in a variety of organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof. In various aspects, the electrolyte may include greater than or equal to about 0.5 M to less than or equal to about 4.0 M of the one or more lithium salts. In certain variations, for example when the electrolyte has a lithium concentration greater than about 2 M or ionic liquids, the electrolyte may include one or more diluters, such as fluoroethylene carbonate (FEC) and/or hydrofluoroether (HFE).

The solid-state electrolyte may include one or more solid-state electrolyte particles that may comprise one or more polymer-based particles, oxide-based particles, sulfide-based particles, halide-based particles, borate-based particles, nitride-based particles, and hydride-based particles. Such a solid-state electrolyte may be disposed in a plurality of layers so as to define a three-dimensional structure, and in certain aspects, the separator 26. In various aspects, the polymer-based particles may be intermingled with a lithium salt so as to act as a solid solvent.

In various aspects, the oxide-based particles may comprise one or more garnet ceramics, LISICON-type oxides, NASICON-type oxides, and Perovskite-type ceramics. For example, the one or more garnet ceramics may be selected from the group consisting of: $Li_{6.5}La_3Zr_{1.75}Te_{0.25}O_{12}$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The one or more LISICON-type oxides may be selected from the group consisting of: $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of: $Li_{1+x}Al_xGe_{2-x}(PO_4)_3$ (LAGP) (where $0 \leq x \leq 2$), $Li_{1+x}Al_xTi_{2-x}(PO_4)_3$ (LATP) (where $0 \leq x \leq 2$), $Li_{1+x}Y_xZr_{2-x}(PO_4)_3$ (LYZP) (where $0 \leq x \leq 2$), $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The one or more Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

In various aspects, the polymer-based particles may comprise one or more polymer materials selected from the group consisting of: polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene) (PVDF-HFP), polyvinyl chloride (PVC), and combinations thereof. The sulfide-based particles may include one or more sulfide-based materials selected from the group consisting of: $Li_2S—P_2S_5$, $Li_2S—P_2S_5$-$MS_x$ (where M is Si, Ge, and Sn and $0 \leq x \leq 2$), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li(Ge_{0.5}Sn_{0.5})P_2S_{12}$, $Li(Si_{0.5}Sn_{0.5})P_sS_{12}$, $Li_{10}GeP_2S_{12}$ (LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where $0.5 \leq x \leq 0.7$), and combinations thereof. The halide-based particles may include one or more halide-based materials selected from the group consisting of: $Li_2CdCl_4$, $Li_2MgCl_4$, $Li_2CdI_4$, $Li_2ZnI_4$, $Li_3OCl$, $LiI$, $Li_5ZnI_4$, $Li_3OCl_{1-x}Br_x$ (where $0<x<1$), and combinations thereof.

In various aspects, the borate-based particles may include one or more borate-based materials selected from the group consisting of: $Li_2B_4O_7$, $Li_2O—(B_2O_3)—(P_2O_5)$, and combinations thereof. The nitride-based particles may include one or more nitride-based materials selected from the group consisting of: $Li_3N$, $Li_7PN_4$, $LiSi_2N_3$, LiPON, and combinations thereof. The hydride-based particles may include one or more hydride-based materials selected from the group consisting of: $Li_3A_1H_6$, $LiBH_4$, $LiBH_4$—LiX (where X is one of Cl, Br, and I), $LiNH_2$, $Li_2NH$, $LiBH_4$—$LiNH_2$, and combinations thereof. In still further variations, the electrolyte 30 may be a quasi-solid electrolyte comprising a hybrid of the above detailed non-aqueous liquid electrolyte solution and solid-state electrolyte systems—for example, including one or more ionic liquids and one or more metal oxide particles, such as aluminum oxide ($Al_2O_3$) and/or silicon dioxide ($SiO_2$).

In various aspects, the electrolyte 30, for example as a solid-state electrolyte, may serve as both a conductor of lithium ions and a separator, for example separator 26, such that a distinct separator component is not required. In various other aspects, however, the separator 26 may be a microporous polymeric separator including, for example a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC. Various other conventionally available polymers and commercial products for forming the separator 26 are contemplated, as well as the many manufacturing methods that may be employed to produce such a microporous polymer separator 26.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26.

The separator 26 may also comprise other polymers in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF— hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), titania ($TiO_2$), and combinations thereof. The heat-resistant material may be selected from the group consisting of: Nomex, Aramid, and combinations thereof.

In various aspects, the negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, the negative electrode 22 may include a plurality of electrolyte particles (not shown). The negative electrode 22 may have a porosity of about 25 vol. %.

The negative electrode 22 may include a negative electroactive material that is lithium based comprising, for example, a lithium metal and/or lithium alloy. In other variations, the negative electrode 22 may include a negative electroactive material that is silicon based comprising silicon, for example, a silicon alloy, silicon oxide, or combinations thereof that may be further mixed, in certain instances, with graphite. In still other variations, the negative electrode 22 may include a negative electroactive material that is a carbonaceous anode comprising, for example, one or more negative electroactive materials such as graphite, graphene, and/or carbon nanotubes (CNTs). In still further variations, the negative electrode 22 may comprise one or more lithium-accepting negative electroactive materials, such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0≤x≤2$, $0≤y≤24$, and $0≤z≤64$), and one or more metal sulfides (such as ferrous or iron sulfide (FeS)). In various aspects, the negative electrode 22 may have a high loading density. For example, the negative electrode 22 may have a loading density of greater than or equal to about 4.0 $mAh/cm^2$.

In various aspects, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (Li-PAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the negative electrode 22 may include greater than or equal to about 50 wt. % to less than or equal to about 99 wt. %, and in certain aspects, optionally greater than or equal to about 50 wt. % to less than or equal to about 95 wt. %, of the negative electroactive material; greater than or equal to about 0 wt. % to less than or equal to about 30 wt. %, and in certain aspects, optionally greater than or equal to about 5 wt. % to less than or equal to about 20 wt. %, of one or more electrically conductive materials; and greater than or equal to about 0 wt. % to less than or equal to about 20 wt. %, and in certain aspects, optionally greater than or equal to about 5 wt. % to less than or equal to about 15 wt. %, of one or more binders.

In various aspects, the positive electrode 24 comprises a lithium-based positive electroactive material that is capable of undergoing lithium intercalation and deintercalation, alloying and dealloying, or plating and stripping, while functioning as a positive terminal of the battery 20. In various aspects, the positive electrode 24 may be defined by a plurality of electroactive material particles (not shown). Such positive electroactive material particles may be disposed in one or more layers so as to define the three-dimensional structure of the positive electrode 24. In certain variations, as noted above, the positive electrode 24 may further include the electrolyte 30, for example a plurality of electrolyte particles (not shown). The positive electrode 24 may have a porosity of about 25 vol. %.

In various aspects, the positive electrode 24 may be one of a layered-oxide cathode, a spinel cathode, and a polyanion cathode. For example, layered-oxide cathodes (e.g., rock salt layered oxides) comprise one or more lithium-based positive electroactive materials selected from $LiNi_xMn_yCo_{1-x-y}O_2$ (where $0≤x≤1$ and $0≤y≤1$), $LiNi_xMn_{1-x}O_2$ (where $0≤x≤1$), $Li_{1+x}MO_2$ (where M is one of Mn, Ni, Co, and Al and $0≤x≤1$) (for example $LiCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ and $LiNi_{0.5}Mn_{1.5}O_4$. Olivine type cathodes comprise one or more lithium-based positive electroactive materials such as $LiV_2(PO_4)_3$, $LiFePO_4$, $LiCoPO_4$, and $LiMnPO_4$. Tavorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the positive electrode 24 may comprise one or more other positive electroactive materials, such as one or more of dilithium (2,5-dilithiooxy)terephthalate and polyimide. In various aspects, the positive electroactive material may be optionally coated (for example by LiNbO$_3$ and/or Al$_2$O$_3$) and/or may be doped (for example by one or more of magnesium (Mg), aluminum (Al), and manganese (Mn)).

The positive electroactive material of the positive electrode 24 may be optionally intermingled with one or more electrically conductive materials that provide an electron conductive path and/or at least one polymeric binder material that improves the structural integrity of the positive electrode 24. For example, the positive electroactive material in the positive electrode 24 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the positive electrode 24 may include greater than or equal to about 50 wt. % to less than or equal to about 99 wt. %, and in certain aspects, optionally greater than or equal to about 50 wt. % to less than or equal to about 95 wt. %, of the positive electroactive material; greater than or equal to about 0 wt. % to less than or equal to about 30 wt. %, and in certain aspects, optionally greater than or equal to about 2 wt. % to less than or equal to about 5 wt. %, of one or more electrically conductive materials; and greater than or equal to about 0 wt. % to less than or equal to about 20 wt. %, and in certain aspects, optionally greater than or equal to about 2 wt. % to less than or equal to about 5 wt. %, of one or more binders.

It may be desirable to perform electrochemical analysis on electrodes, for example negative electrode 22 and/or positive electrode 24 detailed in the context of FIG. 1. Electrochemical analysis may produce calibrations for control systems in Hybrid Electric Vehicles ("HEVs") and Electric Vehicles ("EVs"), for example, pertaining particularly to fast charge, lithium plating, state of charge, and power estimation. Electrodes may be analyzed using a reference electrode disposed with the electrodes in the electrochemical cell, for example battery 20 detailed in the context of FIG. 1. The reference electrode enables monitoring of individual electrode potentials during cell cycling. Such reference electrodes include a reference substrate coated with an electroactive material. Potentials may be monitored in a lab setting or during real-time use of a system including the electrochemical cell. For example, potentials may be detected during operation of a vehicle, as part of regular vehicle diagnostics. Detected potentials can be used in vehicle control algorithms to improve cell performance, such as by raising anode potential to decrease lithium plating.

In various aspects, the present disclosure provides reference electrode substrates, and in further instances, reference electrodes and electrochemical cells including such reference electrode substrates. Reference electrode substrates in accordance with various aspects of the present disclosure may be a one-piece reference electrode substrate having a composite or hybrid structure, including, for example, a substrate portion and a current collector portion. The one-piece reference electrode substrate may be formed from a current collector material, such as a precursor aluminum foil, using an anodizing process. In this manner, each of the separator portion and the current collector portion of a reference electrode substrate are integrally formed by an electroconversion process. The integral formation of the separator portion and the current collector portion allows a one-piece reference electrode substrate to be formed having superior interface strength between the adjacent layers.

Each of the separator portion and the current collector portion of a reference electrode substrate may be porous. The continuous porosity of both the substrate portion and the current collector ensures sufficient permeability of ions through the reference electrode substrate. For example the reference electrode substrate may have a porosity of greater than or equal to about 10 vol. % to less than or equal to about 80 vol. %, optionally greater than or equal to about 10 vol. % to less than or equal to about 60 vol. %, and in certain aspects, optionally greater than or equal to about 10 vol. % to less than or equal to about 50 vol. %.

Figure 2A:
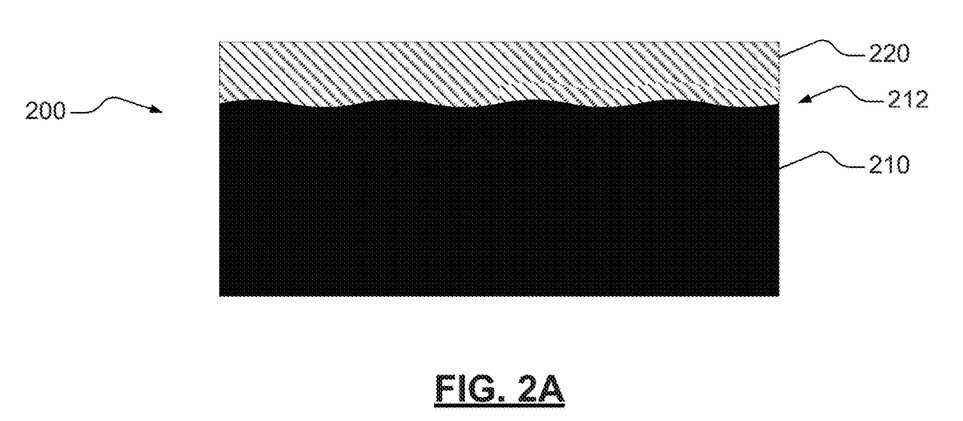
FIG. 2A is a schematic of an example reference electrode substrate prepared in accordance with various aspects of the present disclosure.

With reference to FIG. 2A, an example of an one-piece reference electrode substrate 200 having a composite or hybrid structure in accordance with various aspects of the present disclosure is provided. The hybrid-structured reference electrode substrate 200 includes a separator layer or separator portion 210 and a current collector layer or current collector portion 220. The current collector portion 220 may be substantially aligned and adjacent to the separator portion 210. For example, the current collector portion 220 may cover a substantial portion of a surface area of the separator portion 210. The separator portion 210 may also cover a substantial portion of a surface area of the current collector portion 220. As discussed in further detail below, in various aspects, an interface or transition 212 between the separator portion 210 and the current collector portion 220 may be determined by the process or processes used to make or form the one-piece reference electrode substrate 200.

The separator portion 210 may be a porous layer that is electrically insulating and non-conductive. For example, the separator portion 210 may comprise aluminum oxide. In certain other aspects, the separator portion 210 may include metal oxides of one or more of aluminum, titanium, zinc, magnesium, zirconium, and other similar metals. The separator portion 210 has a porosity sufficient so as to allow ions to pass therethrough during cycling of an electrochemical cell that includes the reference electrode 200. For example, the separator portion 210 may have a porosity of greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The separator portion 210 may have an average cross-section pore size of greater than or equal to about 50 nm to less than or equal to about 500 nm, and in certain aspects, optionally greater than or equal to about 50 nm to less than or equal to about 150 nm. The separator portion 210 may have an average thickness of greater than or equal to about 3 μm to less than or equal to about 300 optionally greater than or equal to about 10 μm to less than or equal to about 100 optionally greater than or equal to about 10 μm to less than or equal to about 50 and in certain aspects, optionally about 15 μm.

The current collector portion 220 may be a porous layer that is electrically conductive. For example, the current collector portion 220 may include aluminum or an aluminum alloy. In certain other aspects, the current collector portion 220 may include one or more of aluminum, titanium, zinc, magnesium, zirconium, and other similar metals. The current collector portion 220 has a porosity sufficient so as to allow ions to pass therethrough during cycling of an electrochemical cell that includes the reference electrode 200. For example, the current collector portion 220 may have a porosity of greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The current collector portion 220 may have an average pore diameter of greater than or equal to about 50 nm to less than or equal to about 500 nm. The current collector portion 220 may have an average thickness of greater than or equal to about 5 µm to less than or equal to about 300 µm, optionally greater than or equal to about 10 µm to less than or equal to about 200 µm, and in certain aspects, optionally about 30 µm.

Figure 2B:
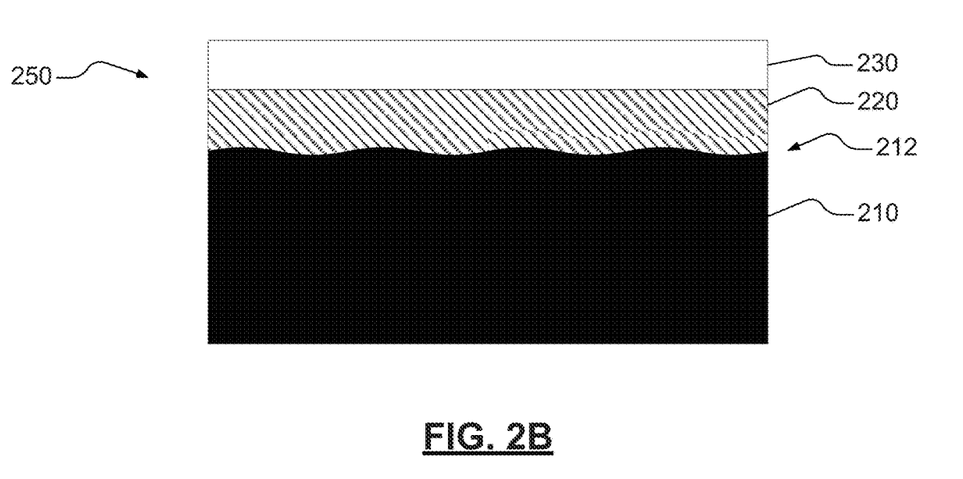
FIG. 2B is a schematic of another example reference electrode prepared in accordance with various aspects of the present disclosure.

With reference to reference to FIG. 2B, one or more electroactive layers 230 may be disposed near or adjacent to the one-piece reference electrode substrate 200 as illustrated in FIG. 2A so as to define a reference electrode 250. For example, as illustrated, an electroactive layer 230 may be disposed near or adjacent to an exposed surface of the current collector portion 220 so as to be in electrical communication with the current collector portion 220. The electroactive layer 230 may be fabricated as a thin film. For example, the electroactive layer 230 may have an average thickness of greater than or equal to about 0.2 µm to less than or equal to about 5 µm, optionally greater than or equal to about 0.2 µm to less than or equal to about 1 µm, and in certain aspects, greater than or equal to about 0.2 µm to less than or equal to about 0.5 µm. Similar to electrodes 22, 24 illustrated in FIG. 1, the electroactive layer 230 may include a plurality of electroactive material particles, a binder, and optionally, a conductive additive.

Figure 3:
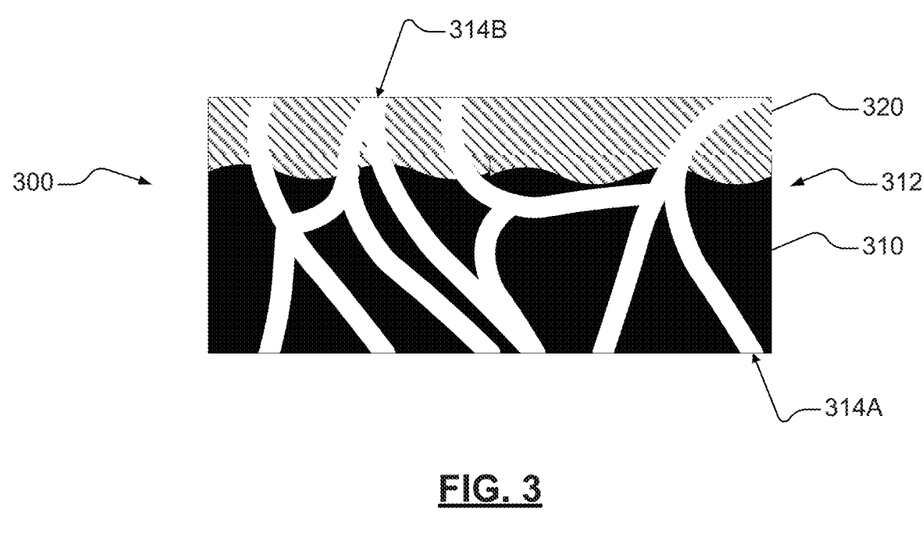
FIG. 3 is a schematic of another example reference electrode substrate prepared in accordance with various aspects of the present disclosure.

With reference to FIG. 3, another example one-piece reference electrode substrate 300 having a composite or hybrid structure in accordance with various aspects of the present disclosure is provided. The hybrid-structured reference electrode substrate 300 includes a separator portion or layer 310 and a current collector layer or portion 320. For example, the separator portion 310 may be a porous layer (e.g., pores 314A) that is electrically insulating and non-conductive. For example, the separator portion 310 may comprise aluminum oxide. The separator portion 310 has a porosity sufficient so as to allow ions to pass therethrough during cycling of an electrochemical cell that includes the reference electrode substrate 300. For example, the separator portion 310 may have a porosity of greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The separator portion 310 may have an average thickness of greater than or equal to about 3 µm to less than or equal to about 300 µm, optionally greater than or equal to about 10 µm to less than or equal to about 50 µm, and in certain aspects, optionally about 15 µm.

The current collector portion 320 may be a porous layer that is electrically conductive. For example, the current collector portion 320 may include aluminum or an aluminum alloy. The current collector 320 has a porosity sufficient so as to allow ions to pass therethrough during cycling of an electrochemical cell that includes the reference electrode substrate 300. For example, the current collector portion 320 may have a porosity (e.g., pores 314B) greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The current collector portion 320 may have an average thickness above the first surface 312 of the separator portion 310 of greater than or equal to about 3 µm to less than or equal to about 300 µm, optionally greater than or equal to about 10 µm to less than or equal to about 50 µm, and in certain aspects, optionally about 15 µm.

As illustrated, the current collector portion 320 may be substantially aligned and adjacent to the separator portion 310. For example, the current collector 320 may cover a substantial portion of a surface area of the separator portion 310. Further, as illustrated pores 314A of the substrate portion 310 may be interconnected or continuous with pores 314B of the current collector portion 320. As noted above, and as discussed in further detail below, in various aspects, an interface or transition 312 between the separator portion 310 and the current collector portion 320 may be determined by the process or processes used to make the one-piece reference electrode substrate 300. For example, in various aspects, a portion of the material defining the current collector portion 320 may extend into the pores 314A of the separator portion 310.

Reference electrode substrates and reference electrode assemblies including the same may have a variety of shapes and sizes. Moreover, the reference electrode assemblies may be used in various configurations and types of electrochemical devices. For example, FIG. 4 provides an example electrochemical cell 400 including a reference electrode assembly 420 prepared in accordance with various aspect of the present disclosure.

The electrochemical cell 400 includes a negative electrode 412 and a positive electrode 414 parallel with the negative electrode 412. A negative electrode current collector 416 may be positioned at or near the negative electrode 412, and a positive electrode current collector 418 may be positioned at or near the positive electrode 414. A reference electrode assembly 420, which includes an electroactive layer 436 and a one-piece reference electrode substrate 450 as further detailed below, and a separator 422 may be disposed between the parallel electrodes 412, 414. For example, as illustrated, the reference electrode assembly 420 may be disposed near or adjacent to the negative electrode 412 and the separator 422 may be disposed near or adjacent to the positive electrode 414. In various alternative aspects, however, the skilled artisan will appreciate that an electrochemical cell 400 may be arranged such that a separator portion 434 of the reference electrode assembly 420 is disposed adjacent to a positive electrode 414 and a separator 422 is disposed between the reference electrode assembly 420 and the negative electrode 412.

Similar to battery 20 illustrated in FIG. 1, each of the components of the electrochemical cell 400 may be imbibed with an electrolyte. Moreover, the electrodes 412, 414 and their respective current collectors 416, 418 and the separator 422 may be formed in a manner similar to that described in the context of FIG. 1. Further, reference electrode assembly 420 may include an electroactive layer 436 and a one-piece reference electrode substrate 450 having a composite or hybrid structure, such as illustrated with respect to reference electrode substrate 200 illustrated in FIG. 2A and/or reference electrode substrate 300 illustrated in FIG. 3. The electroactive layer 436 may be disposed adjacent to or near an exposed surface of the current collector portion 430 so as to be in electrical communication with the current collector portion 430.

Figure 4:
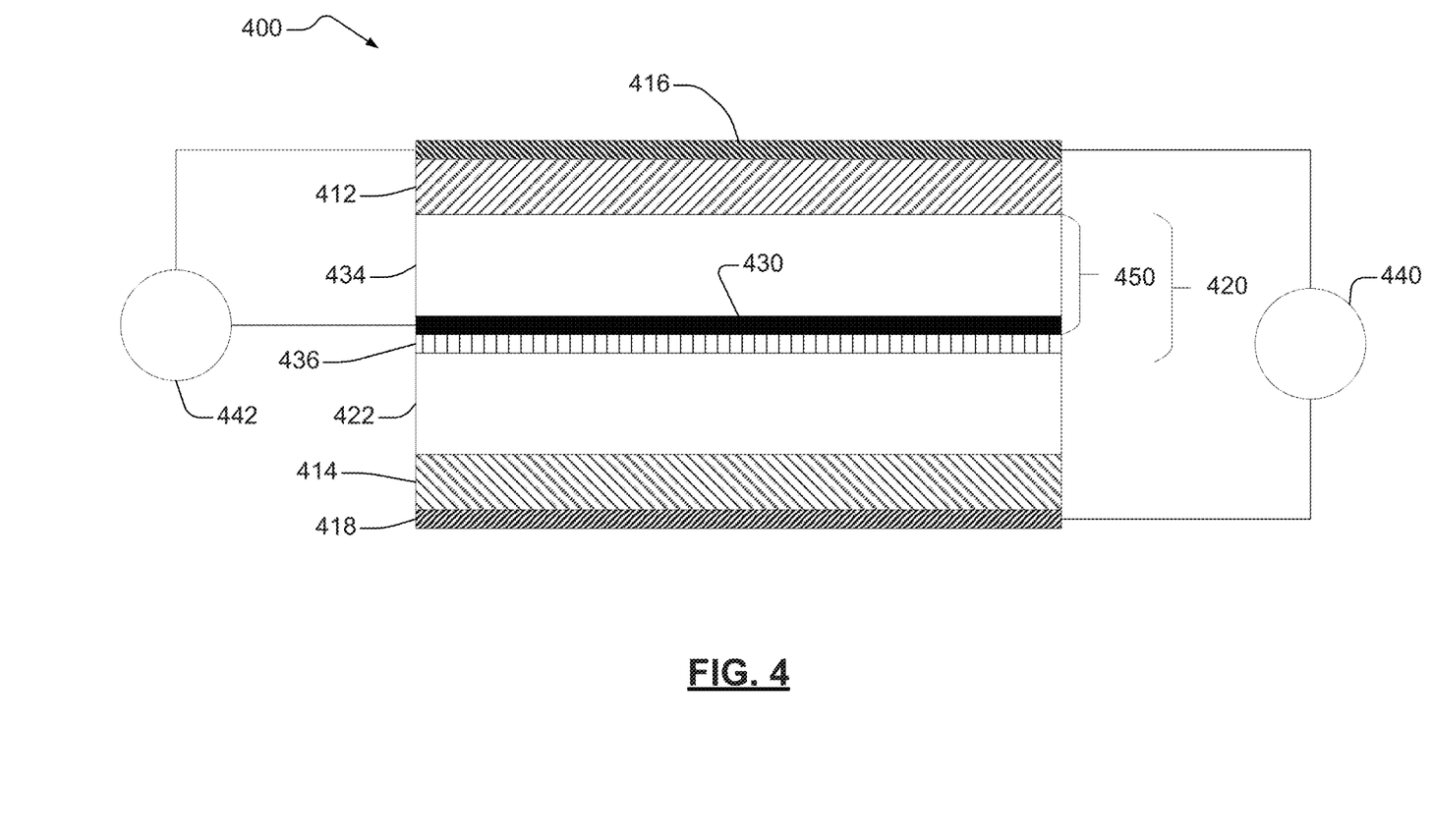
FIG. 4 is a schematic of an example electrochemical device including a reference electrode prepared in accordance with various aspects of the present disclosure.

The hybrid-structured reference electrode substrate 450 illustrated in FIG. 4, includes a separator portion or layer 434 and a current collector layer or portion 430. For example, the separator portion 434 may be a porous layer that is electrically insulating and non-conductive and that acts as a separator within the electrochemical cell 400. For example, the separator portion 434 may comprise aluminum oxide. The separator portion 434 has a porosity sufficient so as to allow ions to pass therethrough during cycling of an electrochemical cell 400. For example, the separator portion 434 may have a porosity of greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The separator portion 434 may have an average thickness of greater than or equal to about 3 μm to less than or equal to about 300 μm, optionally greater than or equal to about 3 μm to less than or equal to about 50 μm, and in certain aspects, optionally about 15 μm.

The current collector portion 430 may be a porous layer that is electrically conductive. For example, the current collector portion 430 may include aluminum. The current collector 430 has a porosity sufficient so as to allow ions to pass therethrough during cycling of an electrochemical cell 400. For example, the current collector portion 430 may have a porosity of greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The current collector portion 430 may have an average thickness of greater than or equal to about 5 μm to less than or equal to about 300 μm, optionally greater than or equal to about 10 μm to less than or equal to about 200 μm, and in certain aspects, optionally about 30 μm.

The electroactive layer 436 may be fabricated as a thin film. For example, the electroactive layer 436 may have an average thickness of greater than or equal to about 0.2 μm to less than or equal to about 5 μm, optionally greater than or equal to about 0.2 μm to less than or equal to about 1 μm, and in certain aspects, greater than or equal to about 0.2 μm to less than or equal to about 0.5 μm. Similar to electrodes 22, 24 illustrated in FIG. 1, the electroactive layer 436 may include a plurality of electroactive material particles, a binder, and optionally, a conductive additive.

A first measurement device, such as a first voltage meter 440 may be electrically connected to the negative electrode 412 (through the negative electrode current collector 416) and to the positive electrode 414 (through the positive electrode current collector 418) so as to detect a potential between the negative and positive electrodes 412, 414. A second measurement device, such as a second voltage meter 442 may be electrically connected to the negative electrode 412 (through the negative electrode current collector 416) and the reference electrode assembly 420 (through current collector portion 430) to detect a potential difference between the negative electrode 412 and the reference electrode assembly 420. In such instances, because characteristics of the reference electrode assembly 420 are known, measurements by the second voltage meter 442 may provide individual potentials of the negative electrode 412. Individual potential of the positive electrode 414 may be determined using the individual potentials of the negative electrode 412.

In various aspects, the present disclosure provides a method for forming reference electrode substrates, for example reference electrode substrate 200 illustrated in FIG. 2A and/or reference electrode substrate 300 illustrated in FIG. 3 and/or reference electrode substrate 450 illustrated in FIG. 4. The method includes anodizing one or more portions or surfaces of a metal-containing precursor material to form a metal oxide deposits or layers on the same. The metal-containing precursor material may include, for example, one or more of aluminum, titanium, zinc, magnesium, zirconium, and other similar metals having a specified grain size and morphology. In certain variations, the method may include anodizing a portion or surface of an aluminum foil so that an aluminum oxide portion (e.g., separator portion) is formed on the portion or surfaces of the aluminum foil (e.g., current collector portion). The microstructure of aluminum foil may have a spherical or granular structure with an average size of greater than or equal to about 10 μm to less than or equal to about 100 and in certain aspects, optionally about 30 In other instances, the microstructure of aluminum foil may include columnar grains or dendrites. In each instance, pores or channels may be defined between the grains, or along grain boundaries, defining the aluminum foil. Grain refiners, such as titanium and/or boron, as well as solidification machine working parameters, may be used to obtain the desired grain sizes and morphologies.

In each instance, anodizing may be an electrolytic process that may include placing the metal-containing precursor material in contact with an electrolytic solution and applying a direct current to the electrolytic solution. For example, the metal-containing precursor material may serve as a working electrode that may be in electrical communication with another electrode via the electrolyte. The electrolytic solution may be an acidic solution including, for example, sulfur and an organic acid. Generally, an anodized portion or layer may be formed or grown by passing a direct current through an electrolytic solution, where the metal-containing precursor material serves as the anode. The current may promote release of hydrogen at the cathode and oxygen at the surface of the anode so as to create a build-up of a metal oxide.

In certain aspects, aluminum anodizing, may be performed in an acidic solution including, for example, sulfuric acid or chromic acid. Such acids may slowly transform the aluminum to aluminum oxide. The acid action in anodizing may be balanced with the oxidation rate so as to form a coating with nanopores having a cross-section size along aluminum grain boundaries of greater than or equal to about 10 nm to less than or equal to about 150 nm. Such pores permit the acidic solution and current to travel therethrough so as to reach further portions of the aluminum substrate and continue the transformation or conversion of aluminum to aluminum oxide so as to form portions or layers having different sizes and/or thicknesses.

In anodizing, the applied voltage may range from greater than or equal to about 1 V to less than or equal to about 300 V, and in certain aspects, optionally greater than or equal to about 15 V to less than or equal to about 20 V. In certain instances, alternating current and/or pulsed current may also be applied. Higher voltages may be used to form thicker metal oxide coatings. The applied current (e.g., anodizing current) may vary based on the surface area of the metal-containing precursor material being anodized. The anodizing current may be greater than or equal to about 30 $A/m^2$ to less than or equal to about 300 $A/m^2$.

In various aspects, the porosity and thickness of the defined portions may be controlled based on the anodizing energy and anodizing solution as previously indicated, as well as anodizing time. Anodizing may occur for greater than or equal to about 1 minute to less than or equal to about 30 minutes. Process parameters for anodization may be optimized to achieve desired performance characteristics for the reference substrate. For example, in various aspects, the method may further include, prior to anodizing, cleaning the metal-containing precursor material using wash chemicals to remove surface grease and contamination, as well as flushing and/or air blow, if necessary. The metal-containing precursor material, for example the aluminum foil, may have an initial thickness of greater than or equal to about 10 to less than or equal to about 500 optionally greater than or equal to about 10 to less than or equal to about 200 and in certain aspects, optionally greater than or equal to about 30 µm to less than or equal to about 200 µm.

In various further aspects, the present disclosure provides another method for forming reference electrodes, for example reference electrode substrate 200 illustrated in FIG. 2A and/or reference electrode substrate 300 illustrated in FIG. 3 and/or reference electrode substrate 450 illustrated in FIG. 4. Similar to the methods described above, this method includes anodizing one or more portions or surfaces of a metal-containing precursor material to form a metal oxide deposits or layers (e.g., separator portion) on the same (e.g., current collector portion). The metal-containing precursor material may include, for example, one or more of aluminum, titanium, zinc, magnesium, zirconium, and other similar metals having a specified grain size and grain morphology. In certain variations, the method may include anodizing a portion of a surface of an aluminum foil so that an aluminum oxide portion is formed on the of the aluminum foil.

This method further includes one or more etching electrolytic processes, for example the metal-containing precursor material may be etched before or after anodizing so as to define desired pore sizes and pore quantity. Etching involves placing the metal-containing precursor material, or a portion thereof, in contact with an etching solution. Deep etching after anodizing may define new pores in the current collector portion and/or increase existing pore sizes in the anodized portion and/or separator portion. For example, etching after anodizing may create new pores in the current collector portion and increase existing pore sizes in the separator portion. In such instances, the metal-containing precursor material may initially be smooth. Deep etching prior to anodization may increase pore sizes and pore quantity. Surface etching prior to anodization may also aid in the cleaning of the metal-containing precursor material so as to remove grease and other debris. Further, surface etching prior to anodization may activate one or more surfaces of the metal-containing precursor material. In each instance, etching prior to anodization may create a metal-containing precursor material have a greater degree of roughness, in particular in the instance of deep etching.

For example, in certain instances a first etching process may be used to clean the one or more portions or surfaces of the metal-containing precursor material to be anodized. The etching solution may include common degreasing cleaning solution. In further variations, the method may include a second etching process. The second etching process may define pores within the metal-containing precursor material (e.g., aluminum foil) and/or in formed anodized layers. The second etching process may determine pore size and morphology. The grain morphology and grain size may be important to each etching process because etching starts and predominantly occurs around the grain boundaries.

The etching processes may be performed by spraying an etching fluid onto the metal-containing precursor material and/or metal oxide portion or placing the metal-containing precursor material or a portion thereof in an etching fluid bath, fluid in the etching fluid bath may be agitated mechanically or ultrasonically. In various aspects, the etching fluid may include one or more acids, such as sulfuric acid and/or phosphoric acid, and/or an alkaline fluid. For example, sulfuric acid may be more effective for etching the metal-containing precursor material and the phosphoric acid may be more effective for etching the metal oxide portion. The etching process may create a porosity in either portion of greater than or equal to about 10 vol. % to less than or equal to about 80 vol. %, optionally greater than or equal to about 10 vol. % to less than or equal to about 50 vol. %, and in certain aspects, optionally greater than or equal to about 20 vol. % to less than or equal to about 40 vol. %. The pore size, distribution, and morphology may be controlled based on the anodizing energy, anodizing solution, and anodizing time, as well as the etching solution (e.g., composition and concentration) and etching time and temperature. Pore size, distribution, and morphology may be further influenced by the agitation of the etching fluid bath, as well as the grain size, grain morphology and microstructure, and chemical composition of the metal-containing precursor material. Pores enlarged using such etching process may have an average cross-section size greater than or equal to about 50 nm to less than or equal to about 500 nm.

In still further variations, the present disclosure provides yet another method for forming reference electrodes, for example reference electrode substrate 200 illustrated in FIG. 2A and/or reference electrode substrate 300 illustrated in FIG. 3 and/or reference electrode substrate 450 illustrated in FIG. 4. Similar to the methods described above, this method includes anodizing one or more first portions or surfaces of a metal-containing precursor material to form a metal oxide deposits (e.g., separator portion) or layers on the same (e.g., current collector portion). This method further includes a second anodizing process or step. The second anodizing step includes, for example, anodizing one or more second portions or surfaces of the metal-containing precursor material. This second anodizing process may be the same or different from the first anodizing process. For example, in various aspects, a reference electrode substrate may be formed having various portions having different characteristics as a result of differing anodizing process. In various aspects, similar to the method detailed above, this method may also further include one or more etching processes or steps.

In still further variations, the present disclosure provides yet another method for forming reference electrodes, for example reference electrode substrate 200 illustrated in FIG. 2A and/or reference electrode substrate 300 illustrated in FIG. 3 and/or reference electrode substrate 450 illustrated in FIG. 4. Similar to the methods described above, this method includes anodizing one or more portions or surfaces of a metal-containing precursor material to form a metal oxide deposit or layers (e.g., separator portion) on the same (e.g., current collector portion). The metal-containing precursor material may include, for example, one or more of aluminum, titanium, zinc, magnesium, zirconium, and other similar metals having a specified grain size and morphology. In certain variations, the method may include anodizing a portion or surface of an aluminum foil so that an aluminum oxide portion is formed on the of the aluminum foil.

Figure 5:
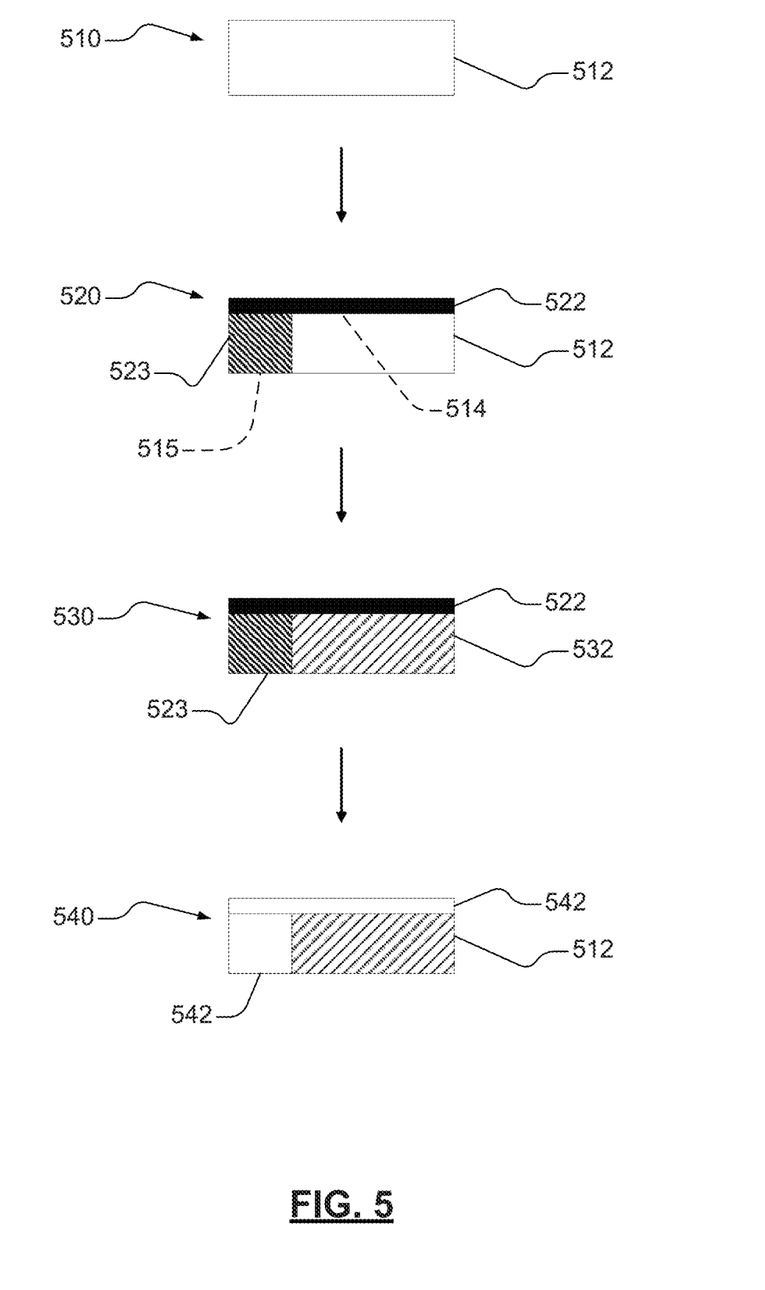
FIG. 5 is a schematic of an example method for forming a reference electrode, for example the reference electrode illustrated in any of FIGS. 2A-4, in accordance with various aspects of the present disclosure.

As illustrated in FIG. 5, this method may include, for example at 510, preparing an aluminum foil 512. The aluminum foil 512 may be prepared by shaping, cleaning, and/or drying, as detailed above. For example, the aluminum foil 512 may be prepared by melting aluminum metal; subjecting the aluminum metal to grain refiners such as by adding titanium and/or boron; pouring the melt (with the grain refiners) into a steel cooling wheel; and rolling the wheel.

As seen at 520, one or more regions or portions of the aluminum foil 512 may be masked or covered using a one or more masking or protecting layers or coverings 522, 523. For example, as illustrated a first masking layer 522 may cover substantially a first surface 514 of aluminum foil 512 and a second masking layer 523 may cover substantially a second surface 515 of the aluminum foil 512. The first and second masks or covers 522, 523 may protect the covered area during subsequent anodizing. In various instances, the first and second masks or covers 522, 523 may comprise one or more known polymers, ceramics, rubbers, organic paintings or coatings, etc. that are stable and inert Exposed portions or regions of the aluminum foil 512 may be anodized, for example at 530, to create anodized portions or regions 532. For example, at 540, the exposed portions or regions of the aluminum foil 512 may be anodized using either bath or spray anodizing. After anodizing, the first and/or second masks or covers 522, 523 may be removed so as to expose the one or more regions of unaltered aluminum foil 542. Though not shown, in certain aspects, the unaltered, exposed aluminum foil 542 may be trimmed or shaped using, for example, a physical cutwater jet, a laser, etc. In various aspects, similar to the method detailed above, this method may also further include one or more etching processes or steps.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A composite reference electrode comprising:
   a separator portion comprising aluminum oxide and having a porosity of greater than or equal to about 10 vol. % to less than or equal to about 80 vol. %;
   a current collector portion integral with and adjacent to the separator portion, the current collector portion comprising aluminum and having a porosity greater than or equal to about 10 vol. % to less than or equal to about 80 vol. %, pores of the separator portion being continuous with pores of the current collector portion such that the pores of the separator portion and the pores of the current collector portion together define a plurality of channels through the composite reference electrode; and
   an electroactive material layer disposed near or adjacent to a surface of the current collector portion away from the separator portion.

2. The composite reference electrode of claim 1, wherein the separator portion has a first average thickness of greater than or equal to about 3 μm to less than or equal to about 300 μm, and the current collector portion has a second average thickness of greater than or equal to about 5 μm to less than or equal to about 300 μm.

3. The composite reference electrode of claim 1, wherein the separator portion has a first average thickness of about 15 μm, the current collector portion has a second average thickness of about 10 μm, the separator portion has a porosity of greater than or equal to about 30 vol. % to less than or equal to about 60 vol. %, and the current collector portion has a porosity of greater than or equal to about 30 vol. % to less than or equal to about 60 vol. %.

4. The composite reference electrode of claim 1, wherein the pores of the separator portion have an average pore diameter of greater than or equal to about 50 nm to less than or equal to about 500 nm, and the pores of the current collector portion have an average pore diameter of greater than or equal to about 50 nm to less than or equal to about 500 nm.

5. The composite reference electrode of claim 1, wherein the electroactive material layer has an average thickness of greater than or equal to about 0.2 μm to less than or equal to about 5 μm.

* * * * *